US011551237B1

(12) United States Patent
Hartsell et al.

(10) Patent No.: US 11,551,237 B1
(45) Date of Patent: Jan. 10, 2023

(54) SYSTEMS AND METHODS FOR DIGITALLY KNOWING AND VERIFYING YOUTHS

(71) Applicant: Wells Fargo Bank, N.A., San Francisco, CA (US)

(72) Inventors: Jonathan Hartsell, Mooresville, NC (US); Nanie Lee, San Francisco, CA (US); Ray G. Redwood, Charlotte, NC (US); Daniel Sanford, Charlotte, NC (US); Elizabeth Votaw, San Franicsco, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

(21) Appl. No.: 17/165,583

(22) Filed: Feb. 2, 2021

Related U.S. Application Data

(60) Provisional application No. 62/969,513, filed on Feb. 3, 2020.

(51) Int. Cl.
| | |
|---|---|
| *G06F 21/31* | (2013.01) |
| *G06Q 30/00* | (2012.01) |
| *G06Q 40/02* | (2012.01) |
| *G06Q 50/00* | (2012.01) |
| *G06Q 50/26* | (2012.01) |
| *G06V 40/16* | (2022.01) |

(52) U.S. Cl.
CPC ......... *G06Q 30/0185* (2013.01); *G06F 21/31* (2013.01); *G06Q 40/02* (2013.01); *G06Q 50/01* (2013.01); *G06Q 50/265* (2013.01); *G06V 40/172* (2022.01)

(58) Field of Classification Search
USPC .................................................. 705/1.1, 35
See application file for complete search history.

(56) References Cited

U.S. PATENT DOCUMENTS

| | | | |
|---|---|---|---|
| 10,387,980 B1* | 8/2019 | Shahidzadeh | H04L 63/18 |
| 10,861,116 B1* | 12/2020 | Onstad | G06Q 30/018 |
| 2011/0072039 A1* | 3/2011 | Tayloe | G06F 21/62 |
| | | | 707/769 |

OTHER PUBLICATIONS

Improving Remote Identity Authentication for Consumers and Financial Institutions by Melissa B. Smart, CFE (Year: 2016).*

* cited by examiner

*Primary Examiner* — William E Rankins
(74) *Attorney, Agent, or Firm* — Foley & Lardner LLP

(57) ABSTRACT

Systems and methods for remotely verifying an identity of a minor to open an account at a financial institution for the minor are provided. A method includes receiving, by a financial institution computing system associated with the financial institution, a request from an adult computing device associated with the adult to open the account; remotely verifying, by a verification circuit, an identity of the adult based on received information regarding the adult; receiving, by the financial institution computing system, information relating to the minor from a minor computing device associated with the minor; remotely verifying, by the verification circuit, the identity of the minor based on the received information relating to the minor; and opening, by an account opening circuit associated with the financial institution computing system, an account on behalf of the minor.

17 Claims, 3 Drawing Sheets

SYSTEMS AND METHODS FOR DIGITALLY KNOWING AND VERIFYING YOUTHS

CROSS-REFERENCE TO RELATED APPLICATIONS

The present application claims priority to U.S. Provisional Application No. 62/969,513, filed Feb. 3, 2020, the entire contents of which are incorporated herein by reference.

TECHNICAL FIELD

The present disclosure relates to systems and methods for remotely digitally knowing and verifying an identity of a person and, particularly, a youth or minor.

BACKGROUND

Know your customer, also known as know your client or, "KYC," is the process of an entity (e.g., a business) verifying the identity of its clients to prevent the business from being used, intentionally or unintentionally, by fraudsters. Know your customer processes are employed by companies of all sizes for the purpose of ensuring their customers, agents, consultants, or distributors are for example antibribery compliant, and are actually who the person/customer claims to be. Banks, insurers, export creditors and other financial institutions are increasingly demanding that customers provide detailed identity information to fulfill KYC requirements. Providing of this information is usually required to be done in-person with a representative of the financial institution. This may be potentially burdensome to some individuals.

SUMMARY

One embodiment relates to a method for remotely verifying an identity of a minor to open an account at a financial institution for the minor. The method includes receiving, by a financial institution computing system associated with the financial institution, a request from an adult computing device associated with the adult to open the account; remotely verifying, by a verification circuit, an identity of the adult based on received information regarding the adult; receiving, by the financial institution computing system, information relating to the minor from a minor computing device associated with the minor; remotely verifying, by the verification circuit, the identity of the minor based on the received information relating to the minor; and opening, by an account opening circuit associated with the financial institution computing system, an account on behalf of the minor.

The method may further include communicating, by the verification circuit, with one or more databases to receive other information regarding the minor. The other information regarding the minor may include a social security number, a driver's license number, or a school email address associated with the minor. The method further includes comparing, by the verification circuit, the received other information regarding the minor to the received information relating to the minor; determining a match of at least one piece of other information to the received information; and responsive to the match, proceeding to remotely verify, by the verification circuit, the identity of the minor.

The method may still further include scraping, by the verification circuit, data from one or more social media profiles associated with the adult; comparing, by the verification circuit, the scraped data to information from the adult regarding the minor; and in response to match, verifying, by the verification circuit, the identity of the minor.

Another embodiment relates to a provider institution computing system structured to remotely verify an identity of a minor. The system includes a verification circuit coupled to a first computing device associated with an adult and a second computing device associated with a minor, the verification structured to: receive information relating to an identity of the minor from the first computing device, the information comprising contact information for the minor; send a notification to the second computing device based on the information received from the first computing device; and in response to receiving an affirmative reply from the second computing device, verify the identity of the minor. The system further includes an account opening circuit structured to open an account for the minor based on the identity of the minor being verified by the verification circuit.

Yet another embodiment relates to a method for remotely identifying an identity of a minor. The method includes receiving, by a financial institution computing system associated with a financial institution, a request from an adult computing device associated with an adult to open an account at the financial institution for the minor; requesting, by a verification circuit from one or more entities, information relating to the identity of the minor based on the request; receiving, by the verification circuit from the one or more entities, the information relating to the identity of the minor; receiving, by the verification circuit from the adult computing device, information regarding the identity of the minor; determining, by the verification circuit, that the information from the one or more entities verifies the identity of the minor based on a comparison of the information from the one or more entities to the information received from the adult computing device; and upon determining that the information verifies the identity of the minor, opening, by an account opening circuit associated with the financial institution, an account for the minor.

This summary is illustrative only and is not intended to be in any way limiting. Other aspects, inventive features, and advantages of the devices and/or processes described herein, as defined solely by the claims, will become apparent in the detailed description set forth herein, taken in conjunction with the accompanying figures, wherein like reference numerals refer to like elements.

DETAILED DESCRIPTION

Figure 1:
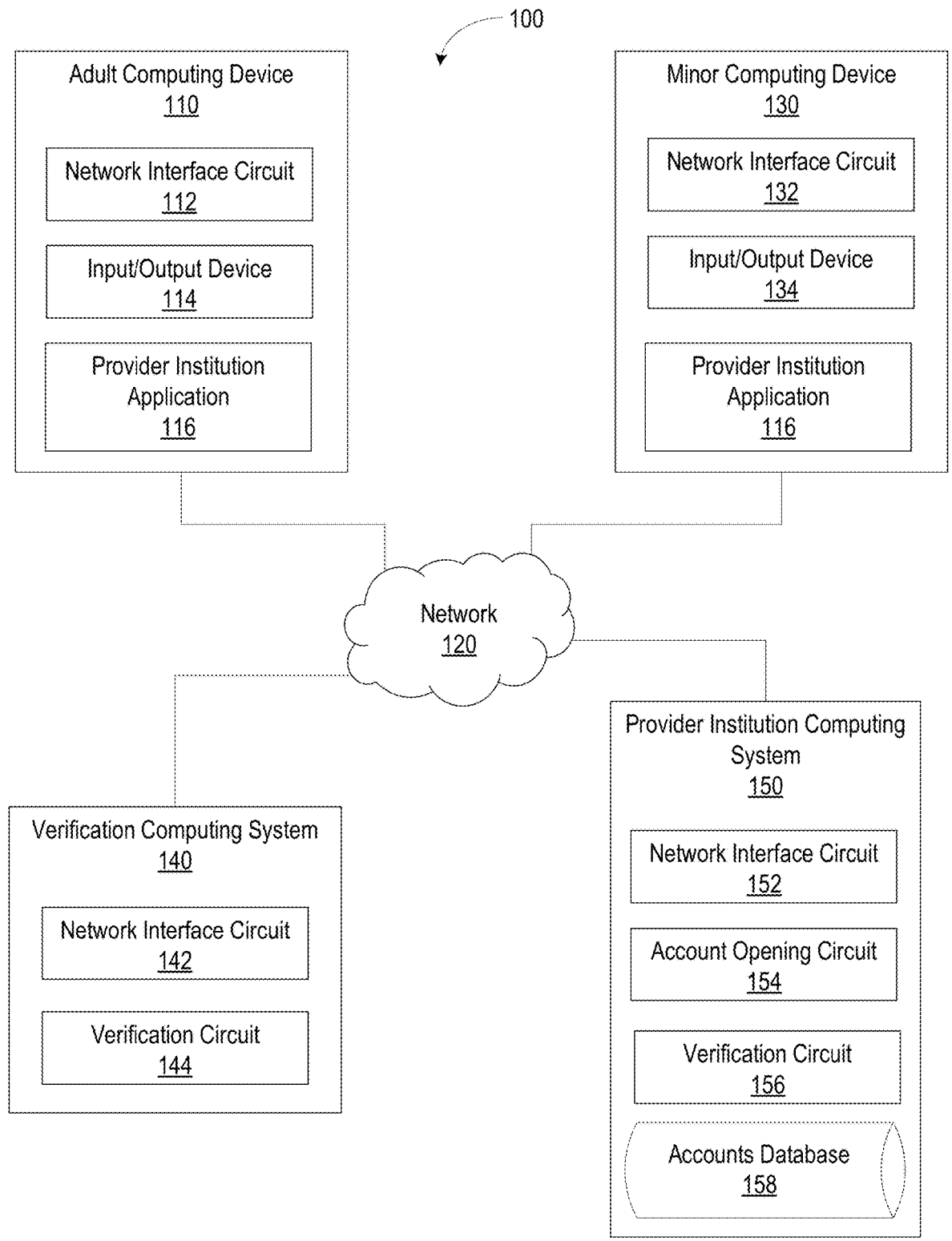
FIG. 1 is a block diagram of a KYC computing system, according to an example embodiment.

Before turning to the Figures, which illustrate the exemplary embodiments in detail, it should be understood that the present disclosure is not limited to the details or methodology set forth in the description or illustrated in the Figures. It should also be understood that the terminology used herein is for the purpose of description only and should not be regarded as limiting.

When a customer opens a financial institution account, typically at least two forms of identification are required so that the identity of the customer may be verified to avoid fraudulent accounts being opened. When opening an account for a youth, this process is more complex given the characteristics of the youth (e.g., a minor, not necessarily having two forms of identification, having no pre-existing relationship with the financial institution so that the financial institution may not trust the minor, and so on). Accordingly and in addition to at least one or more forms of identification, an adult typically must vouch for the minor—i.e., confirm the identity of the minor. This requires both the adult and the minor to be physically present at a physical location of the financial institution (e.g., a bank branch). The adult may also be required to provide documents (e.g., birth certificate, proof of guardianship, etc.) showing the relationship of the adult to the youth (e.g., parent, legal guardian, etc.). The vouching and at least one form of identification represent the KYC process for opening an account for a minor. Assuming the representative approves the documents and adult vouching for the minor, a joint account may be opened listing both the adult and the youth.

Various embodiments described herein relate to remote KYC for youths (e.g., performing a KYC process for a minor where the minor and/or adult are not physically located at a branch of a bank or other financial institution). As described herein, a "youth" is an individual under the age of majority (e.g., an individual not considered an adult by governing body where the individual resides), and may also be referred to herein as a "minor." In one embodiment, the adult digitally and remotely vouches for the identity of the minor (e.g., by responding to a notification from a financial institution) such that no other information is required for the financial institution before opening of the account. In another embodiment, the adult provides information regarding the identity of the minor (e.g., photo identification, birth certificate, etc.) that is verified by an independent third party. In still another embodiment, the identity of the minor is verified by building a profile of the minor and/or the adult based on available data and comparing information in the profile to other verification information. The identity of the minor can also be verified by any combination of these methods.

In particular and in one embodiment, the remote KYC process is initiated by a mobile device associated with an adult via a mobile application provided by a financial or provider institution. The financial institution application may prompt the adult for a verification of the identity of the minor prior to authorizing opening an account in the minor's name. The identity of the minor can be verified in various ways as alluded to above. In one embodiment, the identity of the minor is verified by initiating, from within the financial institution application (e.g., via a chat option provided by a graphical user interface), a video chat with a financial institution representative who can in turn visually verify the minor and/or documents associated with the identity of the minor. After the minor has been verified, the account opening process can proceed. The identity of the minor can also be verified by one or more third parties working in concert with the financial institution application. In such arrangements, the financial institution application may request that an independent third party verify the identity of the minor. The independent third party may attempt to verify the identity of the minor using one or more databases and/or other information. The independent third party notifies the financial institution application regarding the verification process, and upon verifying the identity of the minor, the account opening process can proceed. In another embodiment, the financial institution application can also independently verify the identity of the minor (e.g., verify the identity of the minor without using information provided by an adult associated with the minor). The financial institution application may construct, build, or otherwise generate a profile of the minor using various databases and/or social media feeds to verify the identity of the minor and the relationship between the adult and the minor. Upon a successful verification of the identity of the minor by the financial institution application (financial institution computing system that supports and is coupled to the mobile application), the account opening process can proceed. Thus and in each of these configurations, a minor is able to open an account (particularly, a joint account) remotely and digitally.

The systems and methods described herein provide technical solutions to various problems associated with verifying the identity of a minor when opening an account at a financial institution. For example, an adult typically must be present at a financial institution with the minor when attempting to open an account for the minor with the financial institution. The adult must provide identifying documents proving both the identity of the minor and the legal association of the minor with the adult. In contrast, the systems and methods described herein provide for remotely and digitally verifying the identity of a minor such that neither the minor nor the adult must be physically present at the financial institution to open an account. That said, digital and remote verification of the identity of a minor is riskier than verification of the identity of the minor in person due to the possibility of providing counterfeit documents electronically, fraudsters performing impersonations to open accounts, etc. According to the present disclosure, additional safeguards and more stringent requirements for verification may be implemented to remotely and digitally verify the identity of a minor. For example, the financial institution may provide a shared application that is running on both of the minor's and adult's mobile device. The shared application provides a first security protocol of restricting access to the account application form to only the two synced devices (e.g., another device could therefore not impersonate one of the adult or minor's devices). Via the shared application, acquired biometric information of the minor may be compared to determined/known biometric information of the minor to verify the identity of the minor. Accordingly, a second security protocol advantage is then provided based on the use of biometric information. In this regard, the provider institution computing system may have access to or acquire social media information regarding the adult. From this information, a compilation of presumed minors associated with the adult may be determined. Then, if the biometric information (e.g., facial image) of this minor (as received from the minor's device) matches the biometric information of a minor from the compilation, the computing system determines that there is a likelihood of association of the minor to the adult to confirm the identity of the minor. Thus, the shared application provides a digital version of the adult vouching for the identity of the minor in that the computing system knows the mobile device information of the adult and by that person sharing the application with the other device, the adult is vouching for the identity of the user of this other device. In combination with the facial recognition (i.e., biometric information), two forms of identification are used to verify the identity of the minor. These features and advantages are further described herein.

Referring now to FIG. 1, a block diagram of a KYC computing system 100 is shown, according to an example embodiment. As shown, the KYC system 100 includes an adult computing device 110 associated with an adult, a minor computing device 130 associated with a minor, a verification computing system 140 associated with a third party verification institution, and a provider institution computing system 150 associated with a provider institution (e.g., a bank, etc.). The various systems and devices are operatively and communicatively coupled through a network 120, which may include one or more of the Internet, cellular network, Wi-Fi, Wi-Max, a proprietary banking network, or any other type of wired or wireless network or a combination of wired and wireless networks. In this regard, the network 120 is any suitable Local Area Network (LAN) or Wide Area Network (WAN). For example, the network 120 can be supported by Frequency Division Multiple Access (FDMA), Time Division Multiple Access (TDMA), Code Division Multiple Access (CDMA) (particularly, Evolution-Data Optimized (EVDO)), Universal Mobile Telecommunications Systems (UMTS) (particularly, Time Division Synchronous CDMA (TD-SCDMA or TDS), Wideband Code Division Multiple Access (WCDMA), Long Term Evolution (LTE), evolved Multimedia Broadcast Multicast Services (eMBMS), High-Speed Downlink Packet Access (HSDPA), and the like), Universal Terrestrial Radio Access (UTRA), Global System for Mobile Communications (GSM), Code Division Multiple Access 1× Radio Transmission Technology (1×), General Packet Radio Service (GPRS), Personal Communications Service (PCS), 802.11X, ZigBee, Bluetooth, Wi-Fi, any suitable wired network, combinations thereof, and/or the like. The network 120 is structured to permit the exchange of data, values, instructions, messages, and the like among the adult computing device 110, minor computing device 130, verification computing system 140, and the provider institution computing system 150.

The adult computing device 110 (also referred to as "first computing device") is a computing device associated with an adult (e.g., the primary user of the adult computing device 110 is an adult) and includes a network interface circuit 112, an input/output ("I/O") device 114, and a provider institution application 116. The adult computing device 110 may be, for example, a desktop computer, a laptop computer, a tablet computer, a cellular phone, smartphone, a wearable device, internet of things ("IoT") device, mobile handheld wireless e-mail device, personal digital assistant, portable gaming device, or other suitable device (e.g., mobile and non-mobile devices).

The network interface circuit 112 is structured to enable the exchange of communications over the network 120. The network interface circuit 112 includes, for example, hardware and associated program logic that couples the adult computing device 110 to the network 120 to facilitate operative communication with the minor computing device 130, the verification computing system 140, and the provider institution computing system 150.

The I/O device 114 includes hardware and associated program logic configured to enable the adult computing device 110 to exchange information with one or more of the minor computing device 130, the verification computing system 140, and the provider institution computing system 150. The I/O device 114 may include systems, components, devices, and apparatuses that serve both input and output functions and are configured to exchange information with external systems and/or devices (e.g., a computing system, or a computing device associated with other individuals, etc.). Such systems, components, devices and apparatuses include, for example, a touch screen display, a microphone, a camera, radio frequency transceivers (e.g., radio frequency ("RF") or NFC transceivers) and other short range wireless transceivers (e.g., Bluetooth®, laser-based data transmitters, etc.).

The provider institution application 116 is structured to facilitate access to information associated with a user's account(s) at a provider institution associated with the provider institution computing system 150. The provider institution application 116 is also structured to permit a user to perform various functions related to the account(s) held by the provider institution. Examples of various functions include, but are not limited to, opening and closing accounts, applying for loans, depositing checks, paying bills, checking account balances, etc. In some embodiments, the provider institution application 116 is a separate software application implemented on the adult computing device 110. The provider institution application 116 may be downloaded by the adult computing device 110 prior to its usage, hard coded into the memory of the adult computing device 110, or be a web-based interface application such that the adult computing device 110 may provide a web browser to the application, which may be executed remotely from the adult computing device 110 or downloaded by the adult computing device 110 just prior to its usage. In some embodiments, parts of the provider institution application 116 may be stored in the memory of the adult computing device 110 and others may be web-based. In such instances, the user (i.e., adult in this configuration) may have to log onto or access the web-based interface before usage of the applications. Further, and in this regard, the provider institution application 116 may be supported by a separate computing system (i.e., the provider institution computing system 150) including one or more servers, processors, network interface circuits, etc. that transmit applications for use to the adult computing device 110. In certain embodiments, the provider institution application 116 includes an API and/or a software development kit ("SDK") that facilitates the integration of other applications. The provider institution application 116 is coupled via the network interface circuit 112 over the network 120 to the provider institution computing system 150.

In various arrangements, the provider institution application 116 is structured to provide a prompt to the adult as part of an account opening process for an account, and particularly a joint account with the minor, at the provider institution. In such arrangements, the provider institution application 116 may request or prompt the adult to input information relating to opening an account (e.g., name, address, income, etc.). In arrangements where a user (the adult in this situation) is attempting to open an account for a minor (e.g., a parent attempting to open an account for a child), the provider institution application 116 may request information relating to the minor (e.g., name, date of birth, social security number, relation to the user attempting to open the account on the minor's behalf, etc.). The information relating to the minor may be used by the provider institution computing system 150 to verify or attempt to verify the identity of the minor. The provider institution application 116 may also request information relating to the adult (e.g., account number, name, passcode, etc.) to verify the identity of the adult. In some embodiments, the provider institution application 116 provides the information relating to the minor to the verification computing system 140 or the provider institution computing system 150 to verify the identity of the adult prior to permitting an account to be opened in the minor's name.

The minor computing device 130 (also referred to as "second computing device") is a computing device associated with a minor (e.g., the primary user of the minor computing device 130 is a minor yet the device may be owned by the adult or a different person/entity) and includes a network interface circuit 132, an input/output ("I/O") device 134, and the provider institution application 116. The minor computing device 130 may be, for example, a desktop computer, a laptop computer, a tablet computer, a cellular phone, a smartphone, a wearable device, an internet of things ("IoT") device, a mobile handheld wireless e-mail device, a personal digital assistant, a portable gaming device, or other suitable device (e.g., mobile and non-mobile devices).

The network interface circuit 132 is structured to enable communications over the network 120 and includes, for example, hardware and associated program logic that couples the minor computing device 130 to the network 120 to facilitate communication with the adult computing device 110, the verification computing system 140, and the provider institution computing system 150.

The I/O device 134 is substantially similar to the I/O device 114 and includes hardware and associated program logic configured to enable the minor computing device 130 to exchange information with one or more of the adult computing device 110, the verification computing system 140, and the provider institution computing system 150.

The verification computing system 140 is configured to verify an identity of an individual (e.g., the minor and/or the adult) and includes a network interface circuit 142 and a verification circuit 144. The network interface circuit 142 is structured to enable communications over the network 120 and includes, for example, hardware and associated program logic that couples the verification computing system 140 to the network 120 to facilitate communication with the adult computing device 110, the minor computing device 130, and the provider institution computing system 150.

The verification circuit 144 is configured to search for, receive, and evaluate information associated with an individual and to determine whether the information received and acquired reliably verifies the identity of the individual (e.g., adult, minor, adult and minor). For example, the information received may include, but is not limited to, a social security number, passport information, military information, a driver's license number, a state identification number, information regarding a birth certificate, a school-issued email address associated with the individual, images of the individual from social media profiles associated with the individual, images of the individual from social media profiles associated with an adult purporting to be associated with the individual, etc. The verification circuit 144 may include various algorithms or search logic to aggregate the information and determine whether the information reliably verifies the identity of the individual. For example, the verification circuit 144 may utilize social media scoring or other profile or web activity scoring methods to i) determine that user activity is of a user, and ii) combine this scoring with other known information to verify the identity of the user. In one particular example, the verification circuit 144 may track and scrape social media profiles of users that may be the minor. At this point, there are data points potentially associated with the minor. Each of the plurality of profiles may be scored. In one embodiment, the scoring is a ranking system that ranks the profiles from most likely to be associated with the minor to least likely. For example, profiles corresponding to locations or a location believed to be associated with the minor may be ranked higher than profiles unassociated with that location. As another example, profiles with web activity believed to be associated with the minor's interests (e.g., sports) may be ranked higher. Based on this scoring and ranking, these profiles may be compared to the known information regarding the minor (e.g., date of birth, information provided by the adult, and so on). If the profile matches at least one or a designated piece or pieces of information to the known information, then the verification circuit 144 confirms the identity of the minor.

To receive the information from which a determination can be made regarding the identity of the individual, the verification circuit 144 may contact and communicate with, via the network interface circuit 142 and the network 120, various entities that provide or store information relating to the identity of the individual. For example, the verification circuit 144 may, via one or more APIs, couple to one or more government computing systems. Due to this coupling, the verification circuit 144 may receive government-specific information from these databases (e.g., birth certificate information, state identification number, passport information, motor vehicle records, etc.). As a specific example, the verification circuit 144 may communicate with the department of education to determine the school attended by the individual. The department of education or verification circuit 144 or 156 may then attempt to contact the individual for verification (e.g., via a school-issued email address accessible only by the individual). If the individual responds to the email sent, then the verification circuit 144 may confirm the identity of the minor. If the individual does not respond or does not respond to the email in a predefined or preset amount of time (e.g., 30 minutes), then the verification circuit 144 may not confirm the identity of the minor. With respect to confirming the individual's identity, the verification circuit 144 may have confidence that only enrolled persons with this school may respond and, if the person (minor) responds affirmatively, this is confirmation that the person is enrolled with this school and their identity is confirmed.

In some arrangements, the verification circuit 144 may also communicate with, for example, a technology provider (e.g., Google, Apple, or another entity that provides technology and/or network access to students in schools) in order to determine the identity of the individual. These entities may digitally engage with the individual by, for example, supporting the user's music playlists, Internet browsing history, and so on. If the individual consents to share their credentials with the provider institution computing system 150 to share with the verification computing system 140, then the verification circuit 144 may scrape data from this entity associated with the credentials. Alone or in combination with one or more other factors, the verification circuit 144 may establish a pattern of use of the services provided by this entity to establish a nominal behavior for the user associated with these credentials. If the pattern aligns with an expectation, the verification circuit 144 may confirm the identity of the user. For example, the verification circuit 144 may receive an input that the user goes to school in Delaware and then examine their search history as relating to Delaware-based activities and locations and, in response, confirm the identity of the user based on a geo/location-mapping process.

In yet other arrangements, the verification circuit 144 may communicate with, for example, various social media websites (e.g., Facebook, Instagram, etc.) associated with the individual (minor) and/or one or more adults associated with the individual to create, determine, build, or otherwise generate a profile for the individual based on links/connections between the individual and the one or more adults. For example, the adult profile may be known based on information stored in the provider institution computing system 150. The adult profile may include various images of the adult associated with the adult computing device along with presumed images of the minor based on captions noting the name of the individual (or, face recognition tools may be used to identify a person with the adult and then this recognized image may be cross-checked with a facial image of the minor that is received from the minor device for a match or a substantial match to confirm the identity of the minor). The verification circuit 144 may determine that the individual is associated with the adult based on the images and captions. The profile of the individual may also include various images of the individual with the one or more adults with captions noting the names of the adults. The verification circuit 144 may determine that the individual is associated with the one or more adults based on the images and captions.

The provider institution computing system 150 is operated by a provider institution and is configured to establish and maintain user financial accounts. The provider institution provides products and services such as, but not limited to, credit card accounts, mobile wallet accounts, checking/saving accounts, retirement accounts, mortgage accounts, loan accounts, investment and accounts, and the like via the provider institution computing system 150. The provider institution may be a financial institution, such as commercial or private banks, credit unions, investment brokerages, or the like. The provider institution computing system 150 includes a network interface circuit 152, an account opening circuit 154, a verification circuit 156, and an accounts database 158.

The network interface circuit 152 is structured to enable communications over the network 120 and includes, for example, hardware and associated program logic that couples the provider institution computing system 150 to the network 120 to facilitate operative communication with the adult computing device 110, the minor computing device 130, and the verification computing system 140.

The verification circuit 156 is substantially similar to the verification circuit 144, with the only difference being that the verification circuit 156 is associated with the provider institution computing system 150. In some arrangements, it is desirable to have an independent entity (e.g., the verification computing system 140 and the verification circuit 144) to evaluate and/or verify the identity of individuals. In other arrangements, the provider institution (via the provider institution computing system 150 and the verification circuit 156) may directly evaluate and/or verify the identity of individuals. Accordingly, the functions and structure attributed to the verification circuit 144 herein is equally applicable with the verification circuit 156 and the provider institution computing system 150.

The account opening circuit 154 is configured to evaluate applications for opening new accounts (e.g., jointly owned savings and checking accounts and other types of accounts) and to establish accounts upon approval of the applications. The account opening circuit 154 may receive identification information from one or more of the adult computing device or the minor computing device via the provider institution application 116 regarding the adult and/or minor. The account opening circuit 154 may also receive verification information from one or more of the verification circuit 144 and the verification circuit 156 regarding the verification of the identity of the minor. For example, if the account opening circuit 154 receives information from one or more of the verification circuit 144 and the verification circuit 156 that the identity of the individual attempting to open an account cannot be verified, the account opening circuit 154 may deny the application of the individual. In contrast, if the account opening circuit 154 receives information from one or more of the verification circuit 144 and the verification circuit 156 that the identity of the individual attempting to open an account is verified, the account opening circuit 154 may approve the application of the individual and establish the desired account.

The accounts database 158 may be or include non-transient data storage mediums (e.g., local disc or flash-based hard drives, local network servers) or remote data storage facilities (e.g., cloud servers). The accounts database 158 may include or store personal customer information (e.g., names, addresses, phone numbers), identification information (e.g., driver's license numbers, standard biometric data), and customer financial information (e.g., token information, account numbers, account balances, available credit, credit history, transaction histories). In some arrangements, in order to open an account for a minor at the financial institution, an adult must have an account established at the financial institution for a specified period (e.g., six months, one year, etc.). Before allowing a minor to open an account, the accounts database 158 may be accessed by the account opening circuit 154 to determine if the adult associated with the minor has an account with the provider institution, and whether the account has been open for longer than the specified period.

Figure 2:
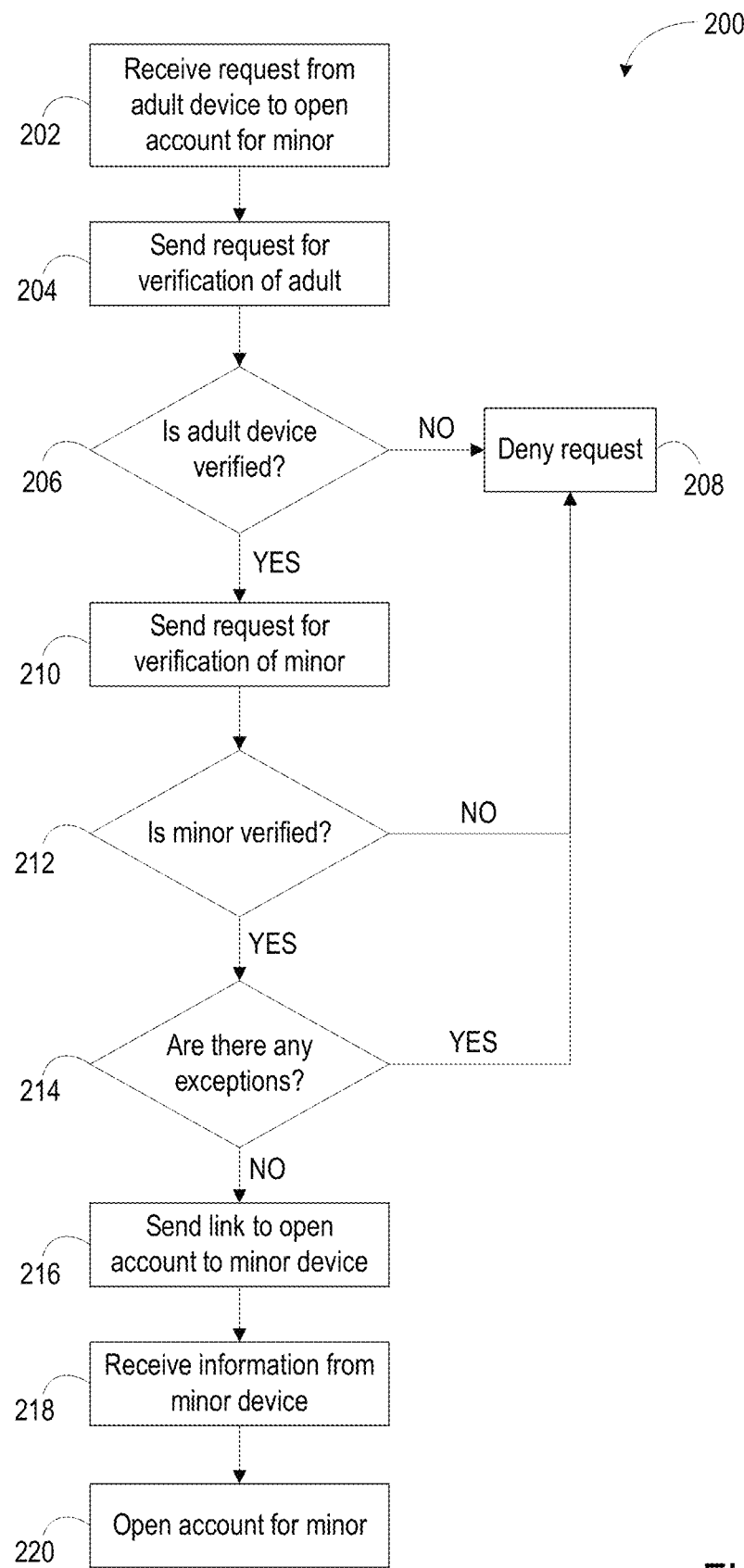
FIG. 2 is a flow diagram illustrating a method for KYC to verify an identity of a minor or youth, according to an example embodiment.

Referring now to FIG. 2, a flow diagram illustrating a method 200 for KYC to verify an identity of a minor in order to open an account for the minor is depicted, according to an example embodiment. At 202, a request is received from an adult device to open an account for a minor at a financial institution. For example, the adult associated with the adult computing device 110 may desire to open an account for a minor legally associated with the adult (e.g., the adult's child, etc.). In one embodiment, the adult may be a new customer to the provider institution. In another embodiment and in order to open an account for a minor, the adult must be a customer of the provider institution for more than a predefined amount of time (e.g., 6 months). The adult may then, via the adult computing device 110, open the provider institution application 116 and begin a process to open an account for the minor by selecting the appropriate buttons/icons on the provider institution application 116 (e.g., a graphical user interface generated and provided by the provider institution application 116 may include a selectable icon for "open a joint account for a minor" that the adult may select). The provider institution application 116 may prompt the adult to provide information relating to the minor such as, for example, the minor's name, address, contact information (e.g., email address, mobile phone number, etc.), date of birth, relationship to the adult, the name of the school attended by the minor, and any other information that can subsequently be used to verify the identity of the minor. In one embodiment, at least two forms of identification of the minor must be verified before being approved to open an account. In other embodiments, one form of identification of the minor must be verified before being approved to open an account.

In some arrangements, the adult computing device 110 and the minor computing device 130 may be digitally coupled during the account opening process. For example, the provider institution computing system 150 may receive information relating to the adult computing device 110 and the minor computing device 130. The information may include one or more of a geographic location of the adult computing device 110 and the minor computing device 130, the name of the network(s) through which the adult computing device 110 and the minor computing device 130 are communicating with the provider institution computing system 150, etc. In some arrangements, the account opening process may only be allowed to proceed if, for example, the adult computing device 110 and the minor computing device 130 are located in the same geographic location (e.g., indicating that the adult and the minor are together during the process), which may be determined based on GPS data from each of the devices. In other arrangements, the account opening process may only be allowed to proceed if, for example, the adult computing device 110 and the minor computing device 130 are communicating over the same network. In yet other arrangements, the account opening process may only be allowed to proceed if each action taken by the adult computing device 110 and the minor computing device 130 occurs within a specified time (e.g., within two minutes, within five minutes, etc.). In still another embodiment, the provider institution computing system 150 may keep track of the mobile/computing devices of the adult and only allow the process to proceed if the minor device is a recognized device of the tracked mobile/computing devices of the adult. In still further embodiments, a tap (e.g., a near field communication tap) may be required to pair or link the adult computing device 110 to the minor computing device 130. By digitally coupling the devices in one or more of these manners, the provider institution application 116 of the adult computing device 110 may be coupled to the provider institution application 116 of the minor computing device 130 in a linked manner as a condition for proceeding with the account opening process. This coupling process acts as a vouching action by the adult for the minor computing device 130. In other words, this linking process ensures that the desired device—the minor computing device 130—is linked or synched to the adult computing device during opening of the account. This coupling results in a shared application of the provider institution application 116 such that direct messaging between the two applications of the two devices occurs. For example, the minor computing device 130 may display, based on a generated GUI from the provider institution application 116, a request to pair or link with the adult computing device 110 which may prompt the minor computing device to NFC tap with the adult computing device 110. This action syncs to the two applications of the two devices during the process thereby adding security to the overall account opening process. In one example, the account application form for the minor is displayed via the provider institution application 116 on both the minor and adult's computing devices. As such, simultaneous editing and revising of the account application form is provided. In other embodiments, this coupling process may be omitted.

At 204, a request for verification of the identity of the adult is sent. For example, prior to allowing the adult to open an account for the minor, the identity of the adult may be required to be verified. The provider institution may, via the provider institution computing system 150 and the provider institution application 116 on the adult computing device 110, prompt or send a request to the adult to enter information for purposes of verifying the identity of the adult. The information requested may include, but is not limited to, a username and password, an identifying number (e.g., a social security number, driver's license number, passport number, etc.), a passcode, a biometric marker (e.g., finger print, retina scan, facial scan, etc.), etc. The identity of the adult may also be verified by sending a verification request to an alternate method of contact (e.g., email address, phone number, etc.) where a verification code may be provided for the adult to enter into the provider institution application 116 via the I/O device 114. In some arrangements, the identity of the adult may be verified by the verification computing system 140 (e.g., via the verification circuit 144) or the verification circuit 156. In arrangements where the identity of the adult is verified by the verification computing system 140, a request may be sent from the provider institution computing system 150 to the verification computing system 140 to initiate the identity verification process for the adult. The verification computing system 140 may then communicate with various other databases (e.g., department of motor vehicles, Social Security Administration, passport services, military enlistment, etc.) to verify or attempt to verify the identity of the adult. In some arrangements, the identity of the adult is verified via a video conference with an employee of the financial institution. For example, the provider institution application 116 may provide the adult with an option to initiate a video call with an employee of the financial institution. Upon connecting with the employee, the employee may ask various identification questions and request to see various forms of identification (e.g., driver's license, etc.) to verify the identity of the adult.

At 206, a determination is made as to whether the identity of the adult is verified by the verification circuit 144 or 156. For example, if the adult provides incorrect information to the provider institution application 116 (e.g., an incorrect passcode and/or password, an incorrect identifying number, an incorrect biometric marker, etc.), at 208, the request to open an account for the minor is denied by the provider institution computing system 150.

If the adult provides information to the provider institution application 116 that allows the provider institution computing system 150 to verify the identity of the adult, at 210, a request for verification of the minor is sent to the verification computing system 140. Alternatively, the verification of the minor may be performed by the provider institution computing system 150 such that a request is not sent to the verification computing system 140. In some arrangements, the request for verification of the minor is sent to the adult computing device 110. In some arrangements, the adult can digitally vouch for the identity of the minor by selecting a box on the provider institution application 116 (i.e., an act of verification by the adult of the minor's identity).

In arrangements where additional verification is required, the adult associated with the adult computing device 110 may be required to provide information relating to the minor to provide or determine a baseline from which the identity of the minor may be verified by the verification computing system 140. For example, the adult computing device 110 may receive a message via the provider institution application 116 that the adult must provide initial identification information (e.g., name, age, date of birth, home address, school information, gender, etc.). The identification information can also include an image or photo of the minor, a copy of an identification card of the minor (e.g., a school or government issued identification card), a copy of the minor's birth certificate, a copy of a school enrollment form, or any other type of information that may be used as a baseline from which the identity of the minor may be verified.

At 212, a determination is made as to whether the identity of the minor is verified by the verification circuit 144. The verification circuit 144 of the verification computing system 140 may, via the network 120, communicate with one or more databases to verify the identity of the minor. In some arrangements, the verification circuit 144 sends a push notification to the minor computing device 130. The push notification may notify the minor that an adult is attempting to open an account in the name of the minor, and allow the minor to approve or deny the attempt. This push notification is based on the received contact information of the minor device from the adult computing device 110 via the provider institution application 116. Approval of the attempt to open the account may serve as one method of verification of the identity of the minor. Further and in this situation, verification of the minor's identity is solely done based on the adult vouching for the minor's identity (i.e., no communication with other databases or systems) and, sometimes, on identity information provided by the minor or adult to the provider institution application 116 and, in turn, the provider institution computing system 150. This is advantageous due to the relatively quickness that an account may be opened for a minor. This use of only adult-provided information may be implemented in certain arrangements, such as when a level of trust is achieved with the adult. The level of trust may be associated with a trigger: when the trust level is at or above the predefined threshold, no trigger is caused; when the trust level is below the predefined threshold, a trigger is caused that causes the verification circuit 156 or 144 to send a message to other databases or acquire other information regarding the minor to confirm his/her identity. In one embodiment, the level of trust is based on a time duration that the adult has been a customer of the provider institution and a current number of assets under management with the provider institution. Relatively longer duration relationships between the adult and the provider institution as well has higher assets under management may result with more trust being given to the adult such that when the adult vouches for the minor, the provider institution computing system 150 (particularly, the verification circuit 156) accepts the vouching. As an example, the customer may be required to have at least $10,000 in an account and have been a customer for 5 years to bypass examination of third-party data to verify the identity of the minor. As another example, different amounts/values or used. Further, other metrics may be used in combination with or in place of the length of time of the relationship and the assets under management, such as whether any flags have been raised with the account (suspected of fraudulent activity, late payment notices, etc.). Thus, defining the "level of trust" or predefined level may vary based on the institution.

In this example, the adult (e.g., parent) may upload identifying information regarding the minor via the provider institution application 116 to the provider institution computing system 150. The adult may provide certain information regarding the minor (e.g., phone number, email address, and other contact information). This generates a prompt being sent via the provider institution application 116 to the minor computing device 130 to sign up for the account. This process serves to engage a computing device (the minor computing device) based on the information provided by the adult. Once the provider institution application 116 on the minor computing device 130 receives a confirmation, the digital identity of the minor is done based only on the adult vouching for the minor. The verification circuit 156 may include controls, such as fraud controls that serve as additional evidence/verification of the minor's identity. For example, the provider institution application 116 on the minor computing device 130 may be required to receive biometric information, a one-time passcode sent to the adult computing device, a credential of the adult for the provider institution application 116 on the adult computing device 110, etc. to authenticate the adult which allows for identification of the minor. As another example, records such as medical records may be required to be provided to the verification circuit 156. If the minor information provided by the adult matches that in the medical records (e.g., a child of the adult), the minor's identity may be verified. This "vouch system" may be used and implemented in a variety of different manners.

In another embodiment and as alluded to above with respect to causing a trigger, the verification circuit 144 may communicate with a third-party (particularly, a trusted third-party). For example, the trusted third-party may be an educational institution associated with the school attended by the minor (e.g., the Department of Education, the school district where the school is located, the individual school, etc.). In this example, the verification circuit 144 may notify the educational institution that a verified adult is attempting to open an account on behalf of the minor. The educational institution may notify the minor (or one of the verification circuits 144 or 156) by sending an email to an email address associated with the minor, and providing the minor with the option of verifying the identity of the minor by clicking on a link in the email (e.g., "this is me" or "this is not me"). The response may be provided to the educational institution, which then provides the response to the verification circuit 144, which notifies the provider institution computing system 150 (or, the response is directly received by one of the verification circuits 144 and 156 if sent by the one of the verification circuits). For example, the provider institution may partner with the educational institution to enable a message to be sent from the provider institution computing system 150 to a selected email address purportedly associated with the minor. The message may contain a passcode (e.g., word, phrase, alpha or alphanumeric value, etc.) that must be entered on the designated minor computing device 130 via the provider institution application 116. If done, the verification circuit 156 can confirm the identity of the minor. In this instance, the school is a trusted third-party. The educational institution may also provide digital copies of documentation offered regarding the minor such that the document(s) provided by the adult and the document(s) provided by the educational institution can be compared by the verification circuit 156 or 144. If the comparison of the documents yields a match (e.g., the information on the documents related to the minor matches), the verification circuit 144 may determine that the identity of the minor is verified. By attempting to verify the identity of the minor in the manner described, certain information related to the minor can be shielded from the verification circuit 144 to maintain privacy for the minor. Moreover, in this way, verification of the identity of the minor is done via an independent pathway of having a person associated with the email address confirm or deny that he or she is the minor. In this regard, if a fraudster was attempting to indicate that they were the minor (when they weren't), this person may be able to fake documents and information, but gaining access to a school ID email address is unlikely and considerably more difficult. Accordingly, when that identity is confirmed via the school ID email address, a reasonable confidence is provided that the minor is who they or the adult purports to be.

In some arrangements, the verification circuit 144 may communicate with a technology provider (e.g., Apple, Google, Dell, or other technology providers). The technology company may attempt to communicate with the minor (e.g., via email, instant message, etc.) and notify the minor that the adult is attempting to open an account on behalf of the minor. A link may be provided to the minor to verify the identity of the minor (e.g., by clicking a link labeled "this is me," or "this is not me," etc.). Or, a passcode may be provided via the email that may be required to be entered (such as via the provider institution application 116 of the minor computing device 130). If the passcode is entered, the provider institution computing system 150 may verify the identity of the minor. In one embodiment, the response of the minor may be provided to the technology provider, which then provides the response to the verification circuit 144, which notifies the provider institution computing system 150.

In some arrangements, the verification circuit 144 may communicate with the technology provider associated with the minor computing device 130. For example, if the minor computing device 130 is a mobile phone, the verification circuit 144 may communicate with the provider associated with the mobile phone number to verify the identity of the minor. If the minor computing device is equipped with facial recognition or other biometric recognition tools (e.g., camera, fingerprint scanner, etc. and associated logic), the provider associated with the mobile phone number may send a push notification to the minor computing device 130 notifying the minor that the adult is attempting to open an account on behalf of the minor. The provider may allow the minor to verify the minor's identity by at least one of i) simply unlocking the mobile device using biometric data (e.g., looking at a camera on the mobile phone so the facial recognition software can verify whether the identity of the person holding the mobile phone is the minor), ii) using biometric data from within the provider institution application, iii) providing a one-time-passcode that the minor enters via the provider institution application, and/or some combination thereof. The results of the facial recognition are provided to the provider institution computing system 150 (verification circuit 156) for verification. In this way, if the minor is able to unlock the phone or otherwise provides confirmed biometric information in combination with the adult vouching for this minor computing device 130 (based on information received from the adult regarding the minor computing device 130), the verification circuit 156 may confirm the identity of the minor. While there is some risk that the biometric information is impersonated, the principle is that the adult knows the minor associated with the device and if the minor can use the device (e.g., based on unlocking the phone), then this information is sufficient to confirm the identity of the minor. In another embodiment and rather than receiving a confirmation or no confirmation notification from the technology provider computing system, the technology provider may instead provide a digital image of the photo taken by the camera of the minor computing device 130 to the verification circuit 144, and the verification circuit 144 can compare the digital image of the photo taken by the camera of minor computing device 130 to an image or photo provided by the adult computing device 110. If the verification circuit determines that the images and/or photos match, the identity of the minor is verified.

In some arrangements, the verification circuit 144 may communicate with various other databases that may verify the identity of the minor. Such databases may include, but are not limited to, a birth certificate database (e.g., a birth certificate may link the minor to the adult as a parent of the minor, etc.), a social security or other government welfare database (e.g., a social security number may link the minor to the adult as a guardian that requested a social security number for the minor, etc.), a motor vehicle database for a minor that has a driver's license (e.g., the data associated with the driver's license may indicate the minor and the adult reside at the same address, etc.), an adoption database (e.g., to show a link between an adopted minor and the adoptive parent(s), etc.), and any other database that compiles information that may be used for the purposes of verifying the identity of a minor. Digital copies of documentation from the various other databases may be provided to the verification circuit 144 to compare to documentation copies provided by the adult (or searched and acquired by the verification circuit 144). If the verification circuit 144 determines that the information relating to the minor on the documentation provided by the adult and the documentation from the various other databases match, the verification circuit 144 can verify the identity of the minor.

In various arrangements, the verification circuit 144 may notify the provider institution computing system 150 that the identity of the minor must be verified via a video conference with an employee of the financial institution. This may occur, for instance, if the identity of the minor cannot otherwise be verified by the verification circuit 144. In such arrangements, an employee associated with the provider institution computing system 150 may initiate a video conference with the adult via the adult computing device 110 and provider institution application 116. During the video conference, the adult may be asked to present various identification documents to prove the identity of the minor.

If the identity of the minor cannot be verified (e.g., if the verification circuit 144 cannot verify the identity of the minor), at 208 the adult computing device 110 is notified and the request to open the account for the minor is denied. If the identity of the minor is verified by the verification circuit 144, then at 214 a determination is made as to whether any exceptions exist that would prevent the adult from opening the account for the minor.

In some arrangements, situations exist in which an adult that is associated with a minor does not have a right to act on behalf of the minor. For example, the adult may be denied such rights by a court in various proceedings (e.g., divorce, etc.). In such situations, even though the identities of both the adult and the minor may be verified, the request to open the account may still be denied by the verification circuit 156. To determine whether such situations exist, the verification circuit 144 may communicate with databases of entities that include the desired information. Such entities may include, but are not limited to, the court system of the country in which the adult and/or minor reside (e.g., to determine whether any orders exist to prevent contact between the adult and the minor or preventing the adult from acting on behalf of the minor, etc.), police records (e.g., to determine whether any police reports indicate that the adult has harmed or attempted to harm the minor, etc.), etc.

If the verification circuit 144 determines that one or more exceptions exist that would prevent the adult from opening an account on behalf of the minor, at 208 the request to open the account is denied by the provider institution computing system 150.

If the verification circuit 144 determines that no exceptions exist that would prevent the adult from opening an account on behalf of the minor, at 216 a link is sent to the minor computing device 130 to open an account. For example, the provider institution computing system 150 sends a notification via the provider institution application 116 to the minor computing device 130. The notification may notify the minor that the minor has been approved to open an account with the provider institution, and provide a link for the minor to select to continue the process to open the account.

At 218, information is received from the minor computing device 130. For example, after selecting the link provided by the provider institution application 116 to open the account, the provider institution application 116 may direct the minor to provide additional information to the provider institution computing system 150 via the provider institution application 116. Such information may include the minor's name, date of birth, address, income, etc.

At 220, the account for the minor is opened by the account opening circuit 154. For example, one or more of the information entered by the minor at 218 and the verification information generated by the verification circuit at 210 and/or 212 are used by the account opening circuit 154 to open the account for the minor. The account for the minor is also added to the accounts database 158.

Though the verification of the identity of the minor and/or adult in FIG. 2 is described with reference to the verification circuit 144, one of ordinary skill would understand that the functions performed by the verification circuit 144 may also be performed by the verification circuit 156. Accordingly, if the financial institution desired to verify the identity of the minor without using the verification computing system 140, the verification circuit 156 may perform the same verification functions as those performed by the verification circuit 144.

Figure 3:
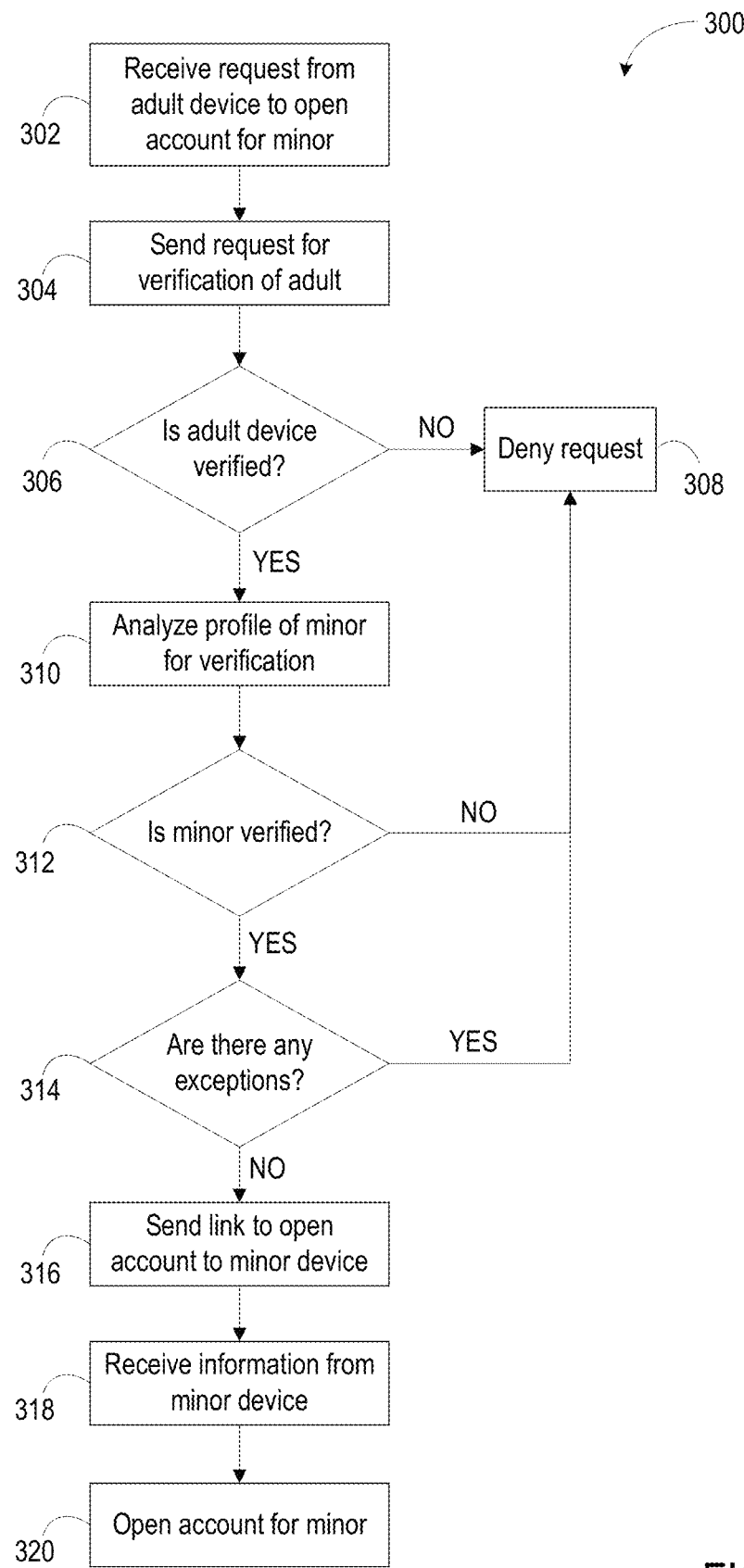
FIG. 3 is a flow diagram illustrating another method for KYC to verify an identity of a minor or youth, according to another example embodiment.

FIG. 3 is a flow diagram illustrating another method 300 for KYC, according to another example embodiment. The method 300 is substantially similar to the method 200, with the only difference being that step 310 differs from step 210 of FIG. 2. Accordingly, the descriptions of steps 302, 304, 306, 308, 312, 314, 316, 318, and 320 are substantially similar to those of steps 202, 204, 206, 208, 212, 214, 216, 218, and 220 of FIG. 2.

At 310, a profile of the minor is analyzed to verify the identity of the minor. In some arrangements, upon receiving information related to the minor from the adult via the adult computing device 110, the verification circuit 156 may build, create, or otherwise generate a profile for the adult and/or the minor by accessing various social media websites (e.g., Facebook, LinkedIn, Instagram, etc.) via the network 120. The verification circuit 156 may scrape data from the social media websites and create a profile based on the data. As used herein, the term "scrape" or "scraping" refers to the process of extracting data from a website. The profile may be a compilation of data/information from one or more websites associated with the adult and/or minor that is used by the verification circuit 144 or 156 to verify the identity of the minor. This compilation of data may be used to determine, by the verification circuit 144 or 156, a pattern of behavior of the minor and/or adult, people connections of the adult and/or minor, and other information pertaining to the adult and/or minor.

In some arrangements, the verification circuit 156 prompts the adult computing device 110, via the provider institution application 116, to provide login credentials to access one or more social media profiles (or other accounts and/or websites) for the adult. In some arrangements, the verification circuit 156 prompts the adult computing device 110, via the provider institution application 116, to provide login credentials to access one or more social media profiles of the minor. Using the credentials provided, the verification circuit 156 may navigate through various web pages associated with the adult and/or the minor and extract data related to the adult and/or the minor. For example, the profile page of the minor may include information such as the minor's name, date of birth, place of residence, a name of the school attended by the minor, etc. This information may be compared with other information provided by the adult to verify the identity of the minor. Additionally, the profile page of the minor may include posts and/or images that mention the name of the adult and/or the relationship between the adult and the minor. This information may be used to verify the relationship between the minor and the adult. Various additional information can also be used by the verification circuit 156 to verify the identity of the minor. For example, the minor may have posted an image of the minor's driver's license to celebrate passing the driver's test. The information available on the image of the driver's license may be used to verify the identity of the minor when attempting to open an account. The verification circuit 156 may compare one or more of an image and various other information related to the minor from the profiles built for the adult and/or the minor to information provided to the verification circuit 156 or the provider institution application 116 by the adult. If the profile built for the adult and/or the minor includes information related to the minor that matches information provided by the adult, the verification circuit 156 may determine that the identity of the minor is verified.

In some arrangements, the verification circuit 156 may attempt to access the social media profiles of the adult and/or the minor without asking to provide login credentials. In such arrangements, the verification circuit 156 attempts to scrape data from the profile pages as described. In instances where the profile pages are not private pages (e.g., any individual is allowed to view the profile pages) the verification circuit 156 may scrape the same data as it could scrape when provided with the login credentials. In instances where the profile pages are private pages (e.g., an individual must be approved by the profile owner before being allowed to view the profile pages), the verification circuit 156 may search for other public profiles that reference the name(s) of the adult and or the minor. For example, a friend of the minor may have a public profile and may have posted various items that reference the minor. The verification circuit 156 may scrape data from the friend's profile page related to the minor in attempts to verify the identity of the minor. The verification circuit 156 may compare one or more of an image and various other information related to the minor from the profiles built for the adult and/or the minor to information provided to the verification circuit 156 or the provider institution application 116 by the adult. If the profile built for the adult and/or the minor includes information related to the minor that matches information provided by the adult, the verification circuit 156 may determine that the identity of the minor is verified.

Though the verification of the identity of the minor and/or adult in FIG. 3 is described with reference to the verification circuit 156, one of ordinary skill would understand that the functions performed by the verification circuit 156 may also be performed by the verification circuit 144. Accordingly, if the financial institution desired to verify the identity of the minor using the verification computing system 140, the verification circuit 144 may perform the same verification functions as those performed by the verification circuit 156.

As utilized herein, the terms "approximately," "substantially," and similar terms are intended to have a broad meaning in harmony with the common and accepted usage by those of ordinary skill in the art to which the subject matter of this disclosure pertains. It should be understood by those of ordinary skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

Although only a few arrangements have been described in detail in this disclosure, those skilled in the art who review this disclosure will readily appreciate that many modifications are possible (e.g., variations in proportions of the various elements, values of parameters, etc.) without materially departing from the novel teachings and advantages of the subject matter described herein. The order or sequence of any method processes may be varied or re-sequenced according to alternative arrangements. Other substitutions, modifications, changes, and omissions may also be made in the design, operating conditions and arrangement of the various exemplary arrangements without departing from the scope of the present disclosure.

While described herein as the adult via the provider institution application 116 on the adult computing device 110 as initiating opening an account for the minor and then engaging the minor via the minor computing device 130 and provider institution application 116, in an alternate embodiment, the minor may initiate the account opening via the minor computing device 130 and provider institution application 116. In one embodiment, information providing via the provider institution application 116 from the minor and regarding the minor may be provided to the verification circuit 144 or 156 for verification. In this case, information may be directly inputted (e.g., name, date of birth, etc.) via the provider institution application 116. Alternatively or additionally, the provider institution application 116 may scrape the minor computing device 130 to send information associated with the use of the minor computing device 130 (e.g., biometric information, public credentials for accounts such as social media accounts, and any other data that may be shared by the minor computing device 130 with the provider institution application 116, etc.). The provider institution application 116 may then transmit this combination of minor-provided data and scraped data from the minor device to the verification circuit 156 to confirm the identity of the minor. This adds security to the identity verification process by using data from the minor computing device 130 that is or likely is not fraudulently manipulated (e.g., by the minor). Based on the received information, the verification circuit 156 may verify the identity of the minor. For example, the verification circuit 156 may use this data to identify potentially related adults (e.g., last name, shared residence/similar geographic location, etc.). The verification circuit 156 may examine the information of the adult, such as whether he or she has kids, the names of the kids, etc. If there is a likelihood that the minor is associated with an identified adult, the verification circuit 156 may send a notification to the adult computing device 110 via the provider institution application 116 to confirm the identity of the minor. If the adult, via the provider institution application 116, confirms the identity, the verification circuit 156 approves the identity and the account may be opened. In another embodiment, multiple notifications are sent to multiple potential adults associated with the minor in order to cast a broader net. In an alternative embodiment, the verification circuit 156 does not reach out to the adult and instead uses acquired or stored information to verify the identity of the minor (e.g., searching government databases for a match of information, etc.). In either situation, the identity of the minor may be verified solely or primarily based on information provided by the minor by the verification circuit 156 to enable an account to be opened for the minor.

The systems and methods described herein provide for remotely and digitally verifying the identity of a minor such that neither the minor nor the adult must be physically present at the financial institution to open an account. Furthermore, the minor and the adult do not need to physically be located in the same place when opening an account. Remotely verifying the identity of a minor provides the benefit of not having to be physically present at a financial institution to open an account on behalf of a minor.

The arrangements described herein have been described with reference to drawings. The drawings illustrate certain details of specific arrangements that implement the systems, methods and programs described herein. However, describing the arrangements with drawings should not be construed as imposing on the disclosure any limitations that may be present in the drawings.

It should be understood that no claim element herein is to be construed under the provisions of 35 U.S.C. § 112(f), unless the element is expressly recited using the phrase "means for."

As used herein, the term "circuit" may include hardware structured to execute the functions described herein. In some arrangements, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some arrangements, a circuit may take the form of one or more analog circuits, electronic circuits (e.g., integrated circuits (IC), discrete circuits, system on a chip (SOCs) circuits, etc.), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on).

The "circuit" may also include one or more processors communicatively coupled to one or more memory or memory devices. In this regard, the one or more processors may execute instructions stored in the memory or may execute instructions otherwise accessible to the one or more processors. In some arrangements, the one or more processors may be embodied in various ways. The one or more processors may be constructed in a manner sufficient to perform at least the operations described herein. In some arrangements, the one or more processors may be shared by multiple circuits (e.g., circuit A and circuit B may comprise or otherwise share the same processor which, in some example arrangements, may execute instructions stored, or otherwise accessed, via different areas of memory). Alternatively or additionally, the one or more processors may be structured to perform or otherwise execute certain operations independent of one or more co-processors. In other example arrangements, two or more processors may be coupled via a bus to enable independent, parallel, pipelined, or multi-threaded instruction execution. Each processor may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some arrangements, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system, etc.) or remotely (e.g., as part of a remote server such as a cloud based server). To that end, a "circuit" as described herein may include components that are distributed across one or more locations.

An exemplary system for implementing the overall system or portions of the arrangements might include a general purpose computing computers in the form of computers, including a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), a distributed ledger (e.g., a blockchain), etc. In some arrangements, the non-volatile media may take the form of ROM, flash memory (e.g., flash memory such as NAND, 3D NAND, NOR, 3D NOR, etc.), EEPROM, MRAM, magnetic storage, hard discs, optical discs, etc. In other arrangements, the volatile storage media may take the form of RAM, TRAM, ZRAM, etc. Combinations of the above are also included within the scope of machine-readable media. In this regard, machine-executable instructions comprise, for example, instructions and data which cause a general purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components, etc.), in accordance with the example arrangements described herein.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative arrangements. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web arrangements of the present disclosure could be accomplished with standard programming techniques with rule based logic and other logic to accomplish the various database searching steps, correlation steps, comparison steps and decision steps.

The foregoing description of arrangements has been presented for purposes of illustration and description. It is not intended to be exhaustive or to limit the disclosure to the precise form disclosed, and modifications and variations are possible in light of the above teachings or may be acquired from this disclosure. The arrangements were chosen and described in order to explain the principals of the disclosure and its practical application to enable one skilled in the art to utilize the various arrangements and with various modifications as are suited to the particular use contemplated. Other substitutions, modifications, changes and omissions may be made in the design, operating conditions and arrangement of the arrangements without departing from the scope of the present disclosure as expressed in the appended claims.

What is claimed is:

1. A method for remotely verifying an identity of a minor to open an account at a financial institution for the minor, the method comprising:
   receiving, by a financial institution computing system associated with the financial institution, a request from an adult computing device associated with an adult to open the account;
   remotely verifying, by a verification circuit, an identity of the adult based on received information regarding the adult;
   receiving, by the financial institution computing system, information relating to the minor from a minor computing device associated with the minor;
   scraping, by the verification circuit, data from one or more social media profiles associated with the adult;
   comparing, by the verification circuit, the scraped data to information from the adult regarding the minor;
   in response to a match, remotely verifying, by the verification circuit, the identity of the minor based on the received information relating to the minor; and
   opening, by an account opening circuit associated with the financial institution computing system, the account on behalf of the minor.

2. The method of claim 1, wherein the verification circuit is associated with the financial institution computing system.

3. The method of claim 1, wherein the verification circuit is associated with a verification computing system, the verification computing system independent from the financial institution computing system.

4. The method of claim 1, further comprising communicating, by the verification circuit, with one or more databases to receive other information regarding the minor.

5. The method of claim 4, wherein the other information regarding the minor comprises a social security number, a driver's license number, or a school email address associated with the minor.

6. The method of claim 5, further comprising:
   comparing, by the verification circuit, the received other information regarding the minor to the received information relating to the minor;
   determining a match of at least one piece of other information to the received information; and
   responsive to the match, proceeding to remotely verify, by the verification circuit, the identity of the minor.

7. The method of claim 1, wherein the information relating to the minor comprises one or more of an image of the minor and an act of verification by the adult.

8. The method of claim 1, further comprising:
sending, by the verification circuit, other information regarding the minor comprising a social security number, a driver's license value, or information regarding a birth certificate of the minor to a computing system storing associated information regarding the minor; and
receiving, by the verification circuit, a confirmation that the associated information matches the other information regarding the minor stored by the financial institution computing system to verify the identity of the minor.

9. A provider institution computing system structured to remotely verify an identity of a minor, the system comprising:
a verification circuit coupled to a first computing device associated with an adult and a second computing device associated with a minor, the verification circuit structured to:
receive information relating to an identity of the minor from the first computing device, the information comprising contact information for the minor;
send a notification to the second computing device based on the information received from the first computing device; and
in response to receiving an affirmative reply from the second computing device, verify the identity of the minor; and
an account opening circuit structured to open an account for the minor based on the identity of the minor being verified by the verification circuit,
wherein the verification circuit is structured to receive an indication of a coupling of the second computing device to the first computing device before the account opening circuit is structured to open the account.

10. The system of claim 9, wherein the verification circuit is further structured to receive additional information relating to the identity of the minor from one or more entities via a network and, based on a combination of the additional information and the information from the first computing device, send the notification to the second computing device to facilitate verification of the identity of the minor.

11. The system of claim 10, wherein the additional information comprises one or more of an image of the minor, an identifying number associated with the minor, and an act of verification by the adult.

12. The system of claim 9, wherein the indication of the coupling includes a near-field communication tap of the first computing device to the second computing device.

13. The system of claim 9, wherein the indication of the coupling includes identifying information regarding the second computing device being received by the verification circuit from the first computing device.

14. A method for remotely identifying an identity of a minor, comprising:
receiving, by a financial institution computing system associated with a financial institution, a request from an adult computing device associated with an adult to open an account at the financial institution for the minor;
requesting, by a verification circuit from one or more entities, information relating to the identity of the minor based on the request;
receiving, by the verification circuit from the one or more entities, the information relating to the identity of the minor;
receiving, by the verification circuit from the adult computing device, information regarding the identity of the minor;
determining, by the verification circuit, that the information from the one or more entities verifies the identity of the minor based on a comparison of the information from the one or more entities to the information received from the adult computing device;
sending, by the verification circuit, an email comprising a passcode to a minor computing device associated with the minor, wherein the email is a school email address identified from at least one of the one or more entities or information from the adult computing device;
in response to not receiving the passcode in a predefined amount of time, not verifying, by the verification circuit, the identity of the minor; and
in response to receiving the passcode from the minor computing device, verifying, by the verification circuit, the identity of the minor and verifying the identity of the minor, opening, by an account opening circuit associated with the financial institution, the account for the minor.

15. The method of claim 14, further comprising requesting, by the verification circuit, information relating to the identity of the adult from the adult computing device prior to contacting and receiving information from the one or more entities regarding the minor.

16. The method of claim 14, further comprising receiving, by the financial institution computing system, information relating to the minor from the minor computing device associated with the minor.

17. The method of claim 16, further comprising comparing, by the verification circuit, the information relating to the minor from the minor computing device to the information from the one or more entities to verify the identity of the minor.

* * * * *